US009009692B2

(12) United States Patent
Kalogeropulos et al.

(10) Patent No.: US 9,009,692 B2
(45) Date of Patent: Apr. 14, 2015

(54) MINIMIZING REGISTER SPILLS BY USING REGISTER MOVES

(75) Inventors: Spiros Kalogeropulos, Los Gatos, CA (US); Partha P. Tirumalai, Fremont, CA (US); Yonghong Song, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1340 days.

(21) Appl. No.: 12/647,484

(22) Filed: Dec. 26, 2009

(65) Prior Publication Data

US 2011/0161945 A1 Jun. 30, 2011

(51) Int. Cl.
*G06F 9/45* (2006.01)

(52) U.S. Cl.
CPC ...................................... *G06F 8/441* (2013.01)

(58) Field of Classification Search
CPC ....................................................... G06F 8/441
USPC ......................................................... 717/152
See application file for complete search history.

(56) References Cited

U.S. PATENT DOCUMENTS

| | | | |
|---|---|---|---|
| 5,530,866 A * | 6/1996 | Koblenz et al. ................ 717/144 |
| 6,009,272 A * | 12/1999 | Goebel ........................... 717/152 |
| 6,434,743 B1 * | 8/2002 | Click et al. ..................... 717/157 |
| 6,651,246 B1 | 11/2003 | Archambault et al. |
| 6,880,045 B2 | 4/2005 | Pong et al. |
| 6,938,130 B2 | 8/2005 | Jacobson et al. |
| 7,395,531 B2 | 7/2008 | Eichenberger et al. |
| 7,426,724 B2 | 9/2008 | Kilgard et al. |
| 7,523,448 B2 * | 4/2009 | Kawahito ...................... 717/151 |
| 7,530,069 B2 | 5/2009 | Kawahara et al. |
| 7,543,282 B2 | 6/2009 | Chou |
| 7,818,729 B1 | 10/2010 | Plum et al. |
| 7,853,934 B2 | 12/2010 | Partamian |
| 8,104,026 B2 * | 1/2012 | Koseki et al. ................. 717/140 |
| 2004/0064811 A1 * | 4/2004 | Altmejd ......................... 717/159 |
| 2004/0226005 A1 * | 11/2004 | Tarditi ........................... 717/151 |
| 2005/0144424 A1 * | 6/2005 | De Vries et al. .............. 712/225 |
| 2006/0026575 A1 | 2/2006 | Cabillic et al. |

(Continued)

OTHER PUBLICATIONS

"Design and Evaluation of Dynamic Optimizations for a Java Just-in-Time Compiler", Suganuma, et al., Jul. 2005, pp. 732-785, http://delivery.acm.org/10.1145/1080000/1075386/p732-suganuma.pdf.

(Continued)

*Primary Examiner* — Idriss N Alrobaye
*Assistant Examiner* — Brooke Taylor
(74) *Attorney, Agent, or Firm* — Rory D. Rankin; Meyertons, Hand, Kivlin, Kowert & Goetzel, P.C.

(57) ABSTRACT

A system and method for minimizing register spills during compilation. A compiler reallocates spilled variables from stack memory to other available registers. Although a corresponding register file may not have available registers for storage, the compiler identifies available registers in other locations for storage. The compiler identifies available registers in an alternate register file, wherein the alternate register file may be a floating-point register file which is then used for spilled integer variables. Other instruction type combinations between spilled variables and alternate register files are possible. When an available register within the alternate register file is identified, the compiler modifies the program instructions to allocate the corresponding spilled variable to the available register.

17 Claims, 7 Drawing Sheets

(56) References Cited

U.S. PATENT DOCUMENTS

| | | | |
|---|---|---|---|
| 2006/0026580 A1 | 2/2006 | Cabillic et al. | |
| 2007/0050762 A1 | 3/2007 | Chen et al. | |
| 2007/0169032 A1* | 7/2007 | Kim et al. | 717/140 |
| 2008/0163185 A1 | 7/2008 | Goodman | |
| 2008/0178157 A1* | 7/2008 | Winberg et al. | 717/128 |
| 2008/0184215 A1* | 7/2008 | Baev et al. | 717/155 |
| 2008/0301697 A1* | 12/2008 | Southgate et al. | 718/105 |
| 2009/0064112 A1* | 3/2009 | Inagaki et al. | 717/140 |
| 2009/0083721 A1* | 3/2009 | Palsberg et al. | 717/140 |
| 2010/0199270 A1* | 8/2010 | Baev | 717/157 |

OTHER PUBLICATIONS

"Compiler Optimization of Embedded Applications for an Adaptive SoC Architecture", Hardnett, et al., Oct. 2006, pp. 312-322, http://delivery.acm.org/10.1145/1180000/1176798/p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

Frasier, C. and Hanson, D.; "Simple Register Spilling in a Retargetable Compiler"; AT&T Bell Laboratories, Murray Hill, NJ and Department of Computer Science, Princeton University, Princeton, NJ; Software-Practice and Experience, vol. 22(1), 85-99; Jan. 1992 by John Wiley & Sons, Ltd.

* cited by examiner

MINIMIZING REGISTER SPILLS BY USING REGISTER MOVES

BACKGROUND OF THE INVENTION

1. Field of the Invention

This invention relates to computer systems, and more particularly, to minimizing register spills during compilation.

2. Description of the Relevant Art

The performance of computer systems is dependent on both hardware and software. In addition to advances in hardware design, advances in compiler design attempt to increase system performance by reducing inefficient code execution. During the later stages, or phases, of compilation, compilers typically perform machine-dependent optimizations on intermediate code representations. One such optimization includes techniques for register allocation, wherein machine registers are assigned to the many variables used in the algorithm of the source code. Prior to register allocation, these variables are stored in an unlimited number of temporary registers, wherein these temporary registers may be virtual registers. The machine registers, or physical registers, are the registers used in the one or more register files of the processor. These registers are also referred to as architectural registers. A processor may have at least one integer register file and one floating-point register file. In such a case, an integer register may be assigned an integer variable and a floating-point register may be assigned a floating-point variable.

The register-to-variable assignments may not be set during the entire execution time of the program code. Rather, these assignments may correspond to varying periods of time in which they are valid, or utilized. It may be said that a variable has a "live range", where a live range may be measured as the range of time between when a first instruction (producer) assigns a value to the variable and when a second instruction (last consumer) last consumes the value of the variable. The producer and consumer instructions correspond to an intermediate representation of the source code, which is used during this phase of machine-dependent compilation. After the second instruction, or the last consumer, the variable may not be used again. Alternatively, the variable may be assigned again by a later third instruction, which would initiate another live range.

The live ranges of variables as described above may be measured by an instruction count or a cycle count. Similarly, a machine register live range may be defined as a period of time the machine register is assigned a variable and the variable is utilized. Therefore, a machine register has periods of time that it is assigned with a value of a variable and utilized, periods of time it is assigned but not utilized, and periods of time it is not assigned. A machine register may be assigned to different variables during different time periods.

The number of machine registers is finite and relatively small compared to the number of variables requiring storage assignment. During the register allocation phase, a stack implemented in memory is assigned to store variables when at a particular period of time the number of variables requiring storage is greater than a number of available machine registers in a corresponding register file. The variables that are not assigned to machine registers are "spilled" to the stack memory. The variables, or spill values, will be reloaded from the stack memory to a machine register before the variables are used. Memory access operations, such as store and load instructions, are used to spill values to the stack memory and to reload spill values from the stack. Therefore, in the intermediate representation of the source code, the virtual registers without a machine register assignment will be spilled to the stack such that a define of the virtual register (producer instruction) will be followed by a store operation to the stack and a use of the virtual register (consumer instruction) will be proceeded by a load operation from the stack.

The disadvantages of spilling values to the stack include memory access operations requiring more time than moving values between registers. Programs typically need many memory accesses, and, therefore, the performance may be limited by the accesses to the stack memory. Also, the demand for a critical resource, such as memory, increases with additional accesses due to register spills. In addition, a reload of a spilled value typically requires more time to perform than a normal load operation since there is often a read-after-write (RAW) penalty when reloading a value that has been recently stored. Further, the store queue may fill with spill values. Consequently, there may be little remaining space for other updates to memory, and this limited space in the store queue may lead to delays in processing store operations.

In view of the above, efficient methods and mechanisms for minimizing register spills during compilation are desired.

SUMMARY OF THE INVENTION

Systems and methods for minimizing register spills during compilation are contemplated.

In one embodiment, a compiler includes first instructions configured to generate code and second instructions that reassign the storage of spilled variables. In one embodiment, spilled variables are recorded during compilation. Spilled variables may represent those variables for which a register was not available during a register allocation process. In one embodiment, spilled variables are allocated to a stack using memory load and/or store instructions. Although a corresponding register file may not have available registers for storage, the compiler is configured to identify available registers in other locations for storage. When an available register is identified, the compiler modifies the program instructions to allocate the corresponding spilled variable to the available register.

In one embodiment, the compiler identifies an alternate register file, which is a dedicated register file for an instruction type different from an instruction type of a corresponding spilled variable. In various embodiments, instruction types may include integer, floating-point, multimedia, or otherwise. When the compiler determines a period of use of a spilled variable is covered by a period of availability of a register within the alternate register file, the compiler may allocate the spilled variable to the register in the alternate register file. If multiple spilled variables are found to be candidates for allocation to a same register, spilled variables may be prioritized and a higher priority spilled variable may be chosen from a lower priority spilled variable from the candidates. Subsequently, the code generation instructions replace corresponding stack memory load and store instructions for the spilled variable with inter-register-file move instructions.

Figure 1:
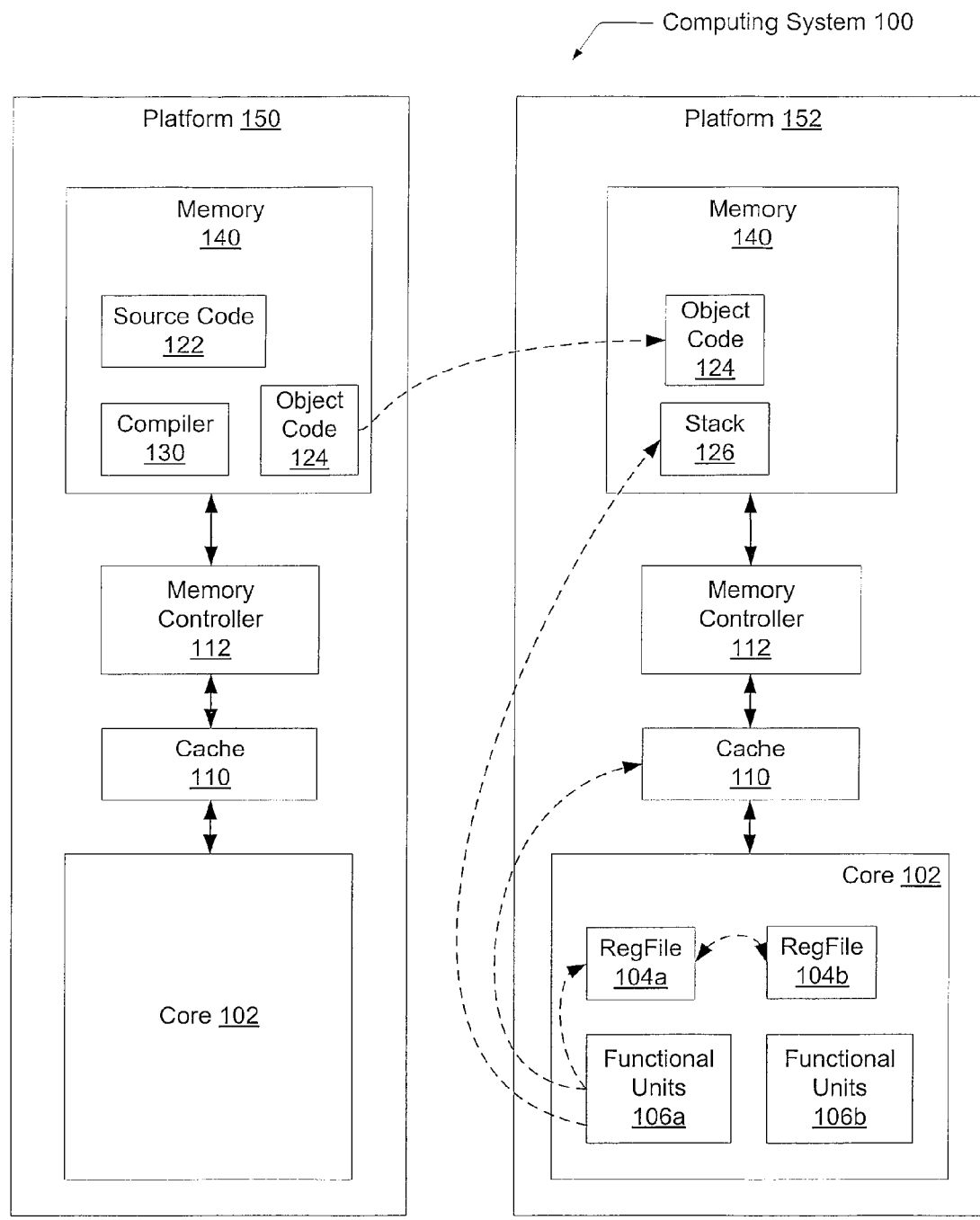
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Referring to FIG. 1, one embodiment of a computing system 100 is shown. System 100 includes two platforms 150 and 152. Platforms 150 and 152 may or may not include a same architecture, but may include similar components as further described shortly. The software applications, or source code 122, written by a developer may be executed on a variety of machines, such as platforms 150 and 152. A machine may refer to a computer, a mobile phone, a personal digital assistant (PDA), a server, or otherwise. A machine may include one or more processors comprising one or more processor cores 102, which is further described shortly.

Generally speaking, source code 122 is written by a software developer, stored in memory 140 within platform 150, and may be compiled by a compiler 130. This compiler 130 may produce compiled object code 124, which may be conveyed to a customer to execute on platform 152. The dashed line between the copies of object code 124 on platforms 150 and 152 is shown to illustrate the production of object code 124 on platform 150 and the execution of object code 124 on platform 152.

Compiler 130 that produces object code 124 may include a late machine-dependent phase that minimizes the spilling of variable values to a memory stack, such as memory stack 126. This particular phase may use machine-dependent characteristics, such as a number and type of register files 104a-104b, to minimize the number of spilled variable values. In one embodiment, register file 104a may be an integer register file and register file 104a may not have enough machine registers to store all integer variable values used during execution of source code 122. Therefore, the machine-dependent phase of compiler 130 may search for available machine registers in an alternate register file such as register file 104b, which may be a floating-point register file. If available machine registers are found, then the spilled integer variable values may be stored in these registers, rather than stored in memory. System performance may increase, since register access has a smaller latency than memory access. The dashed lines between functional unit 106a and register file 104a, cache 110, and stack 126 within memory 140 illustrates the relative latencies of accesses. A latency for a register access from register file 104a may be much smaller than a latency for accesses from the other storage locations. The type of a first register file and an alternate register file may include other combinations such as floating-point and integer, integer and multimedia, or otherwise.

The components of platform 150 are further described here. Platform 150 may have one or more cores 102, although only one is shown. Each core 102 may include a superscalar microarchitecture with one or more multi-stage pipelines. Each core 102 may be configured to execute instructions of software applications corresponding to an instruction set architecture (ISA) such as x86, SPARC, PowerPC, MIPS, ARM, or other. Also, each core 102 may be designed to execute multiple strands, or threads. For example, a multi-thread software application may have each of its software threads scheduled to be executed on a separate pipeline within a core 102, or alternatively, a pipeline may process multiple threads via control at certain function units.

Core 102 within platform 152 may execute extensions to an ISA such as multimedia instructions, cryptographic instructions, or otherwise. Core 102 may include a set of functional units 106a-106b and a corresponding dedicated register file 104a-104b for different instruction types. In one embodiment, a register file dedicated for use by a given instruction type may only be directly accessed by instruction of the given type. For example, in one embodiment, a register file dedicated for use by integer type instructions (and which may be referred to as an "integer register file") cannot be directly accessed by floating point instructions. Similarly, a register file dedicated for use by floating point instructions (e.g., a floating point register file), cannot be directly accessed by non-floating point instructions. The different instruction types may include integer, floating-point, multimedia, cryptography, or otherwise. Therefore, in one embodiment, functional units 106a and a register file 104a may correspond to integer instructions. Functional units 106b and a register file 106b may correspond to floating-point instructions, and so forth. A register file is a set of registers, which are used to stage data between memory and the functional units on the chip. The register file may be part of the architecture, or the instruction set architecture (ISA), and, therefore, may be referred to as architecture or architected registers. The register file is visible to the programmer and the compiler. A modern register file is typically implemented with fast static random-access-memory (RAM) that has multiple dedicated read and write ports.

Each core 102 may comprise a first-level cache or in other embodiments, the first-level cache may be outside the core 102. Each core 102 and first-level cache may be coupled to shared resources such as a second-level caches 110 and lower-level memory 140 via memory controllers 112. Interfaces between the different levels of caches may comprise any suitable technology. In other embodiments, other levels of caches may be present between a first-level cache and memory controller 112. In one embodiment, an I/O interface may be implemented in memory controller 112 to provide an interface for I/O devices to cache 110, other caches located both internally and externally to core 102, and to core 102. Memory controllers 112 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives.

A further description of the functionality and the phases of compiler 130 is provided later in greater detail. Here, it is noted that compiler 130 is used to produce object code 124 from source code 122. The source code 122 stored in memory 140 may be software applications written by a software developer in a high-level language such as C, C++, Fortran, or otherwise. The source code 122 may be written to perform predetermined steps of an algorithm or method. One or more libraries may be used during the software development. These libraries, which may be written by the software developer, may include code and data that describe one or more subroutine definitions. These subroutines may be referenced for use by code in other files such as through a function call. The libraries may allow the sharing and changing of code and data in a modular fashion. The libraries may utilize references known as links to connect to executable files. A link-editor and a runtime linker (not shown), both used in later stages, may typically perform the process of linking.

Figure 2:
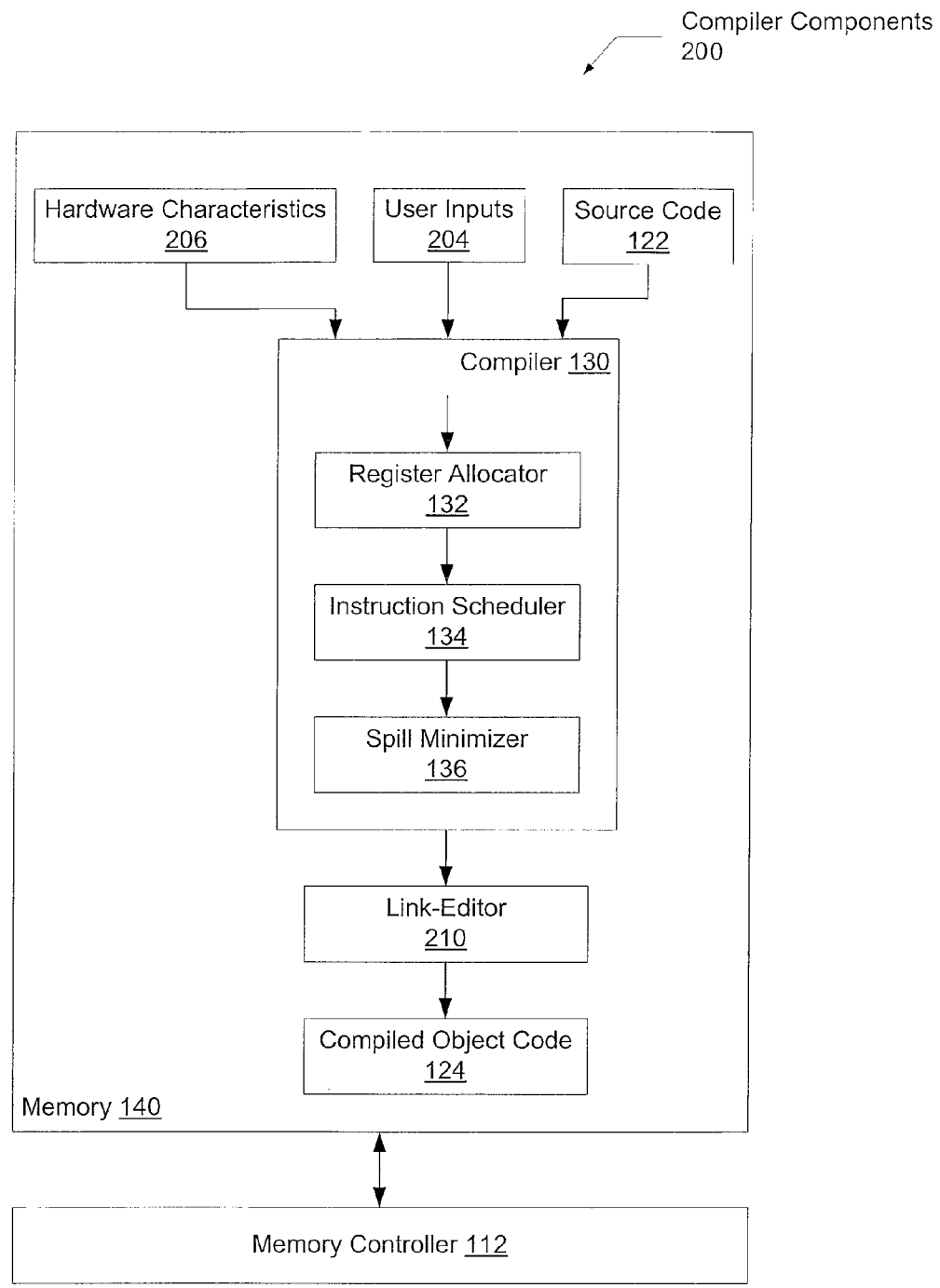
FIG. 2 is a generalized block diagram illustrating one embodiment of compiler components.

Referring to FIG. 2, one embodiment of compiler components 200 is shown. The same components used in FIG. 1 are numbered identically. System 200 includes a compiler 130 for compiling source code 122 according to predetermined optimization techniques and input values such as user inputs 204 and hardware characteristics 206. Compiler 130 may include at least the following back-end phase and machine-dependent optimization components: register allocator 132, instruction scheduler 134, and a spill minimizer 136.

As described in further detail below, compiler 130 may perform at least front-end semantic processing and machine-independent code translation. Following other optimizations and machine-dependent translation, the register allocator 132 within compiler 130 may use one of several known techniques for making register allocation assignments. The assignments represent an association of variable values used in a translation, or intermediate representation, of source code 122 to storage resources in a platform 150 or 152. These storage resources may include register files 104a-104b and a memory stack 126. An intermediate representation of source code 122 may process a number of different data items at any given time. A register files 104a, which may be a first choice for register allocation, may comprise a finite number of registers. Therefore, at any given time, not every variable value in use at a given time may be assigned to a register. A variable value in use may be referred to as a live variable value.

The live variable values described above may or may not be allocated to registers. For the live variable values that are not allocated to registers, these values may be stored in and loaded from memory, such as random-access-memory (RAM). The assignment of these live variable values to memory may be referred to as "spilling". Spilling may reduce a computing system's performance since register access is typically faster than memory access. Register allocation may occur for a basic block, an entire function or procedure, or in-between functions.

The instruction scheduler 134 within compiler 130 may rearrange the order of instructions to avoid pipeline stalls and to improve instruction-level parallelism. Although the instruction scheduler 134 is shown to follow register allocator 132, instruction scheduling may be done either before or after register allocation or both before and after register allocation. An advantage of performing instruction scheduling before register allocation is maximum parallelism may be reached. A disadvantage of performing instruction scheduling before register allocation is that it may increase the number of live variable values to assign to machine registers, such as registers within register file 104a or register file 104b. Such a case, as discussed above, may cause a "spill" of live variable values to memory stack 126. A spill typically reduces the performance of the section of code where the spill occurs due to memory accesses have greater latencies than register accesses.

The spill minimizer 136 may be a new component within compiler 130. Spill minimizer 136 may inspect the output of register allocator 132 and instruction scheduler 134, such as live variable value assignments, machine register assignments for registers within the multiple register files, and instruction ordering. After inspection of this output, spill minimizer 136 may determine the variable live values designated as spills with the highest performance cost. For at least these spilled variable values with the highest performance cost, the spill minimizer 136 may attempt to allocate them to an alternate register file.

An allocation as described above may include replacing the spill memory access instructions with inter-register-file move instructions. In one embodiment, an inter-register-file move instruction is a machine instruction that moves data directly between two register files (e.g., between an integer and floating point register file). The spill memory access instructions may include corresponding store and load instructions for spilling a value to and from the memory stack 126. The inter-register-file instructions move values from one register file to another register file. For example, an integer live variable value designated as a spill may be moved to an available floating-point register in a floating-point register file. Such a replacement may reduce the use of memory accesses for live variable values designated as spills.

Returning to the compilation of software, the source code 122 may be stored on a computer readable medium. A command instruction, which may be entered at a prompt by a user, with any necessary options, such as user inputs 204 and hardware characteristics 206, may be executed in order to compile the source code 122. The inputs 204 and 206 may be input files stored in memory. Hardware characteristics 206 may provide hardware details of the system to execute the output of compiler 130. The system used for execution of the compiled code may be platform 152, in one example.

Compiler 130 may generate one or more object files in response to compiling the source code 122. The front-end compilation may translates the source code 122 to a lower-level representation. Syntactic and semantic processing as well as some optimization is performed at this step. As is well known by those skilled in the art, the optimizations may utilize at least dependence graphs, control flow graphs, array and pointer analysis, redundancy elimination, and otherwise. Most modern compilers may be split into a number of relatively independent phases, or passes. Separate phases allow one or more phases to be later improved or replaced, and additional phases may later be inserted to permit additional optimizations.

Although modern compilers have two or more phases, these phases are usually regarded as being part of the front-end or the back-end. There is not a hard boundary of responsibilities between these two phases. An advantage of splitting the front-end of a compiler from the back-end is that front-ends for different languages may be combined with back-ends for different processors. Generally speaking, the front-end performs syntactic and semantic processing and translates the source code 122 to a lower-level of representation.

Compiler 130 may perform optimizations on the lower-level representation produced by translating the source code 122. The independence provided by this representation of the source code 122 from the machine code allows generic optimizations to be shared between versions of the compiler. In one embodiment, the compilation method is completely static and the lower-level representation is an output of a front-end phase to be further compiled statically into machine code. Machine code is a general term that refers to patterns of bits with different patterns corresponding to different commands, or instructions, to the machine or processor.

The back-end may perform more transformations and optimizations for a particular computer architecture and processor design. Also, the steps of register allocation and instruction scheduling are performed as described above regarding register allocator 132 and instruction scheduler 134. A number of spill memory access instructions may be reduced by the spill minimizer 136. A link-editor 210 may receive the multiple object files that are output from the compiler 130 and combine several separate object files into one object file while resolving one or more internal references between them. This building process may incorporate into an object file the library material containing the implementation of standard routines and procedures and any other modules that may have been supplied by the user. The compiled and linked object files 124 may be input into other software for later execution.

During the different phases of compilation, the compiler 130 may use the user inputs 204 and hardware characteristics 206 to direct the operations of the compilation phases. For example, the hardware characteristics 206 may provide a general description of the pipeline and hardware resources of a machine that may execute source code 122. One such characteristic is the machine available storage. The machine available storage may be used for the storage of variable values used during the execution of source code 122. These values may be used to stage data between memory, such as memory 140 and cache 110, and the functional units 106a-106b. The machine available storage 130 may include one or more register files 104a-104b. As used herein, elements referred to by a reference numeral followed by a letter may be collectively referred to by the numeral alone. For example, register files 104a-104b may be collectively referred to as register files 104.

Each register file may include a different number of architectural registers for storage. For example, a register file 104a may include M registers and a register file 104b may include N registers, wherein N may or may not be different from M. In one embodiment, register file 104a corresponds to an integer register file and register file 104b corresponds to a floating-point register file. In addition, a system such as platform 152 may include a stack memory 126. Generally speaking, a stack 126 is a region of memory where data is added or removed in a last-in-first-out manner. Each thread of execution on a processor typically has a reserved stack. When a function within source code 122 executes, the function may add some of its state data to the top of a stack 126. When the function exits it may be responsible for removing that data from the stack 126. At a minimum, a thread's stack 126 is used to store the location of function calls in order to allow return statements to return to the correct location, but programmers may further choose to explicitly use the stack 126. Also, compiler 130 may use the stack 126 for the storage of live variable values that spill as discussed above.

Figure 3:
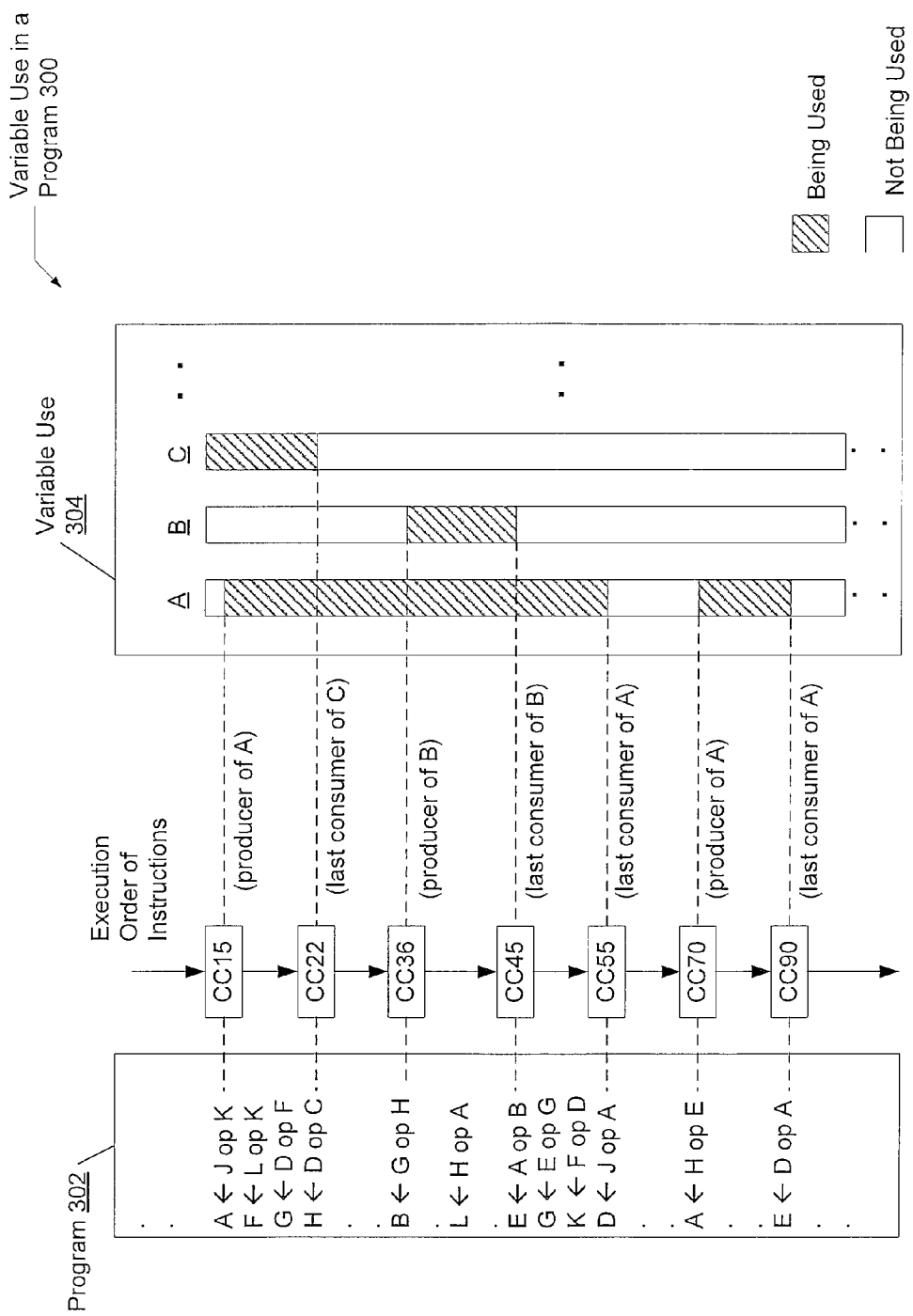
FIG. 3 is a generalized block diagram illustrating one embodiment of variable use in a program.

Turning now to FIG. 3, one embodiment of variable use 300 in a computer program is shown. The variables are labeled with generic names, such as A, B, and so forth, to simplify the illustration. Program 302 illustrates a portion of a simplified computer program that may be included in source code 122. Program 302 uses very general variable names and operators in order to simply the example. In one embodiment, program 302 is an output of multiple optimization and translation phases of compiler 130. The variable use 304 illustrates variable value live ranges, or the periods of time that a variable value is in use, or is live. The period of time may measure a time duration between a producer instruction and a last consumer instruction corresponding to the variable. The period of time may be measured by a count of instructions, a count of simulated clock cycles, or otherwise.

Looking at ranges 304, it can be seen that variable A has two live ranges shown. A first range begins with the producer instruction A←J op K within program 302 at clock cycle (CC) 15. Compiler techniques for estimating execution time are well known in the art. The hardware characteristics 206 may be used to determine the times. The relative time may have more significance than the absolute time in this analysis. Also, the clock cycle times shown are arbitrarily chosen to simplify the example. Here, at CC 15, the instruction is a producer for variable A. The instruction D←J op A at CC 55 is a last consumer for the variable A. Therefore the first range for variable A ends here. Similarly, live ranges for a corresponding variable, in general, may be defined as the range of time between an instruction that is a producer for the corresponding variable and an instruction that is a last consumer for the corresponding variable. The second range for variable A is shown between CC 70 and CC 90. The ranges for variables B and C are defined in a similar manner as shown in variable use 304.

Figure 4:
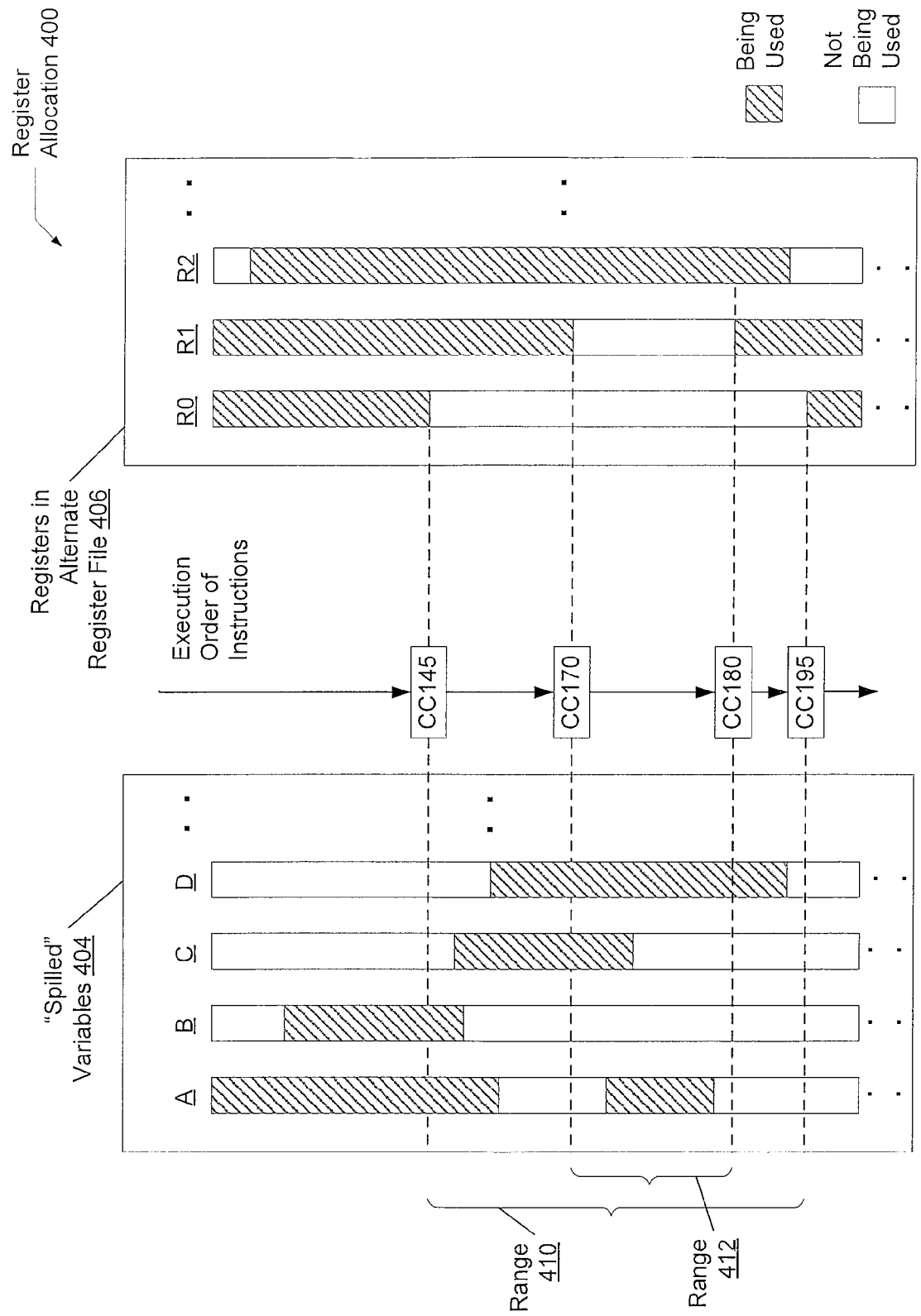
FIG. 4 is a generalized block diagram illustrating one embodiment of register allocation for spilled variables.

Turning now to FIG. 4, one embodiment of register allocation 400 for spilled variables is shown. Spilled variables 404 may represent the variables of a certain instruction type that the register allocator 132 is unable to assign to a machine register. The range, or period, of time of use of the variables, or the time range when they are "live", is shown in the shaded areas. In one embodiment, the spilled variables may correspond to a particular instruction type with a corresponding dedicated register file such as integer, floating-point, multimedia, cryptographic, or otherwise. An alternate register file different from the corresponding dedicated register file may be chosen for possible allocation of the spilled variables. For example, if the spilled variables correspond to integer variables used in integer instructions, then an alternate register file may be a floating-point register file, a multimedia register file, or otherwise. If the spilled variables are able to fit, or be assigned for allocation, in the alternate register file, then the spilled variables may not be spilled to the stack memory 126.

The registers 406 in the alternate register file are shown to be in use during certain ranges, or periods, of time during program execution. The shaded areas illustrate the corresponding ranges of use of the registers, whereas the clear areas show the periods of availability for assignment of the registers. In the embodiment shown, each register has been assigned at some point during execution. It is noted that it is possible for a register to not be assigned, although not shown in this example. In the embodiment shown, the clear areas indicate periods of time when the corresponding register is available. Here, available refers to being assigned, but not utilized at the current time. Available may also refer to as not being assigned. The shaded areas may indicate the periods of time when the register is assigned and utilized. This period of time may correspond to the time between when a variable assigned to the register is produced and when the variable is last consumed. When a register is currently not in use, or available, it may be possible to assign a spilled variable to the register.

In the embodiment shown in FIG. 4, register R0 is available between CC 145 and CC 195. The period of availability is shown by range 410. As can be seen in FIG. 4, the spilled variables A, C, and D each have a live range within this range 410. Any one of these three spilled variables may be assigned to register R0 for this time period. A method for choosing which spilled variable to assign may include a performance cost analysis, a round-robin assignment, a least-recently-used (LRU) assignment, or otherwise. For this example, spilled variable C may be chosen to be assigned to register R0.

When a spilled variable is identified to fit within a period of availability of a register in an alternate register file, the program code may be modified to remove the corresponding spill to the stack memory. When such a determination is made, a store instruction that spills the spilled variable from a register in a corresponding register file to the stack memory may be replaced with an inter-register-file move instruction that moves the spilled variable to the available register in the alternate register file. Similarly, a load instruction that reloads the spilled variable from the stack memory to the original register in the corresponding register file may be replaced with an inter-register-file instruction that moves the spilled variable from the available register in the alternate register file to a register in the corresponding register file. An example of this code modification using variable C from the above example is provided next.

In the above example, spilled variable C is identified to fit within range 410 of register R0. Continuing with this example, variable C may be an integer variable currently stored in a register in an integer register file. However, during a particular period of execution time, there may not be enough integer registers within the integer register file to store all of the integer variables. During a register allocation phase, at least variable C may be chosen to be spilled to the stack memory. However, later during a spill minimizing phase, it may be determined that register R0 in an alternate register file, such as the floating-point register file, is available during this same period of execution time. Therefore, rather than spill the variable C to the stack memory, the variable C may be assigned to the register R0 in the alternate register file, or the floating-point register file. When the variable C is "spilled" and "reloaded", inter-register-file move instructions may be used, rather than store and load instructions to and from the stack memory. In one embodiment, the program code modifications may be performed by the spill minimizer 136 within compiler 130.

Returning to registers 406 in FIG. 4, after the register R0 is inspected for a possible assignment, another register within the alternate register file may be chosen. The choice of a next register to inspect may be determined by a simple increment, a round-robin method, a LRU method, a method based on properties or other characteristics of the registers and their use, or otherwise. One method, for example, may iteratively choose registers within a first pool of registers that have been assigned but have periods of availability due to not being utilized. Subsequently, after all registers within the first pool have been chosen, the method may proceed by choosing registers within a second pool. The second pool of registers may correspond to registers that have not been assigned. Other methods for choosing among the registers within the alternate register file are possible and contemplated. To continue with the current example, register R1 may be chosen after register R0 is inspected and possibly assigned.

It is shown in FIG. 4 that register R1 in the alternate register file is available between CC 170 and CC 180. The period of availability is shown by range 412. As can be seen in FIG. 4, the spilled variable A has a live range within this range 412. Here, only variable A is shown to fit within range 412, although other spilled variables not shown may also fit in range 412. To simply the example, it is assumed only variable A fits within range 412. Spilled variable A may be assigned to register R1 for this time period. The program code may be modified as discussed above to replace memory access instructions with inter-register-file move instructions. Following, another register within the alternate register file may be chosen, and so forth.

It is noted that more than one alternate register file may be available for assigning spilled variables. For example, spilled integer variables may be spilled to a floating-point register file, a multimedia register file, or otherwise. Different methods may be utilized for choosing which alternate register file to use for possible assignments. Also, it is possible to use registers in all alternate register files. Such a method may treat the registers in the multiple alternate register files as a single pool of registers. The amount of decision-making logic may increase for such embodiments, but designers may find the benefit-to-cost ratio to be still beneficial.

It is further noted that the examples referring to FIG. 4 initially chose a register within an alternate register file and subsequently identified one or more spilled variables that fit, or are covered, by the period of availability of the chosen register. For example, register R0 was chosen, and then it was found that spilled variables A, C, and D fit within range 410. However, it is possible for alternate embodiments to initially choose a spilled variable and subsequently identify one or more registers within alternate register file(s) that have a period of availability that covers the spilled variable's live range. For example, a method based on cost analysis or other means may be used to initially choose a spilled variable within spilled variables 404. In one example, these spilled variables may be integer spilled variables. Spilled variable C may be initially chosen. The registers within an alternate register file may be inspected to identify which registers may have a period of availability that overlaps the live range of spilled variable C. If multiple registers are found, then another method may be used to choose for assignment a single register from the set of multiple available registers. Following, the code modifications discussed above regarding replacing memory access instructions with inter-register-file move instructions may occur. A subsequent spilled variable may then be chosen based on a predetermined method.

Figure 5:
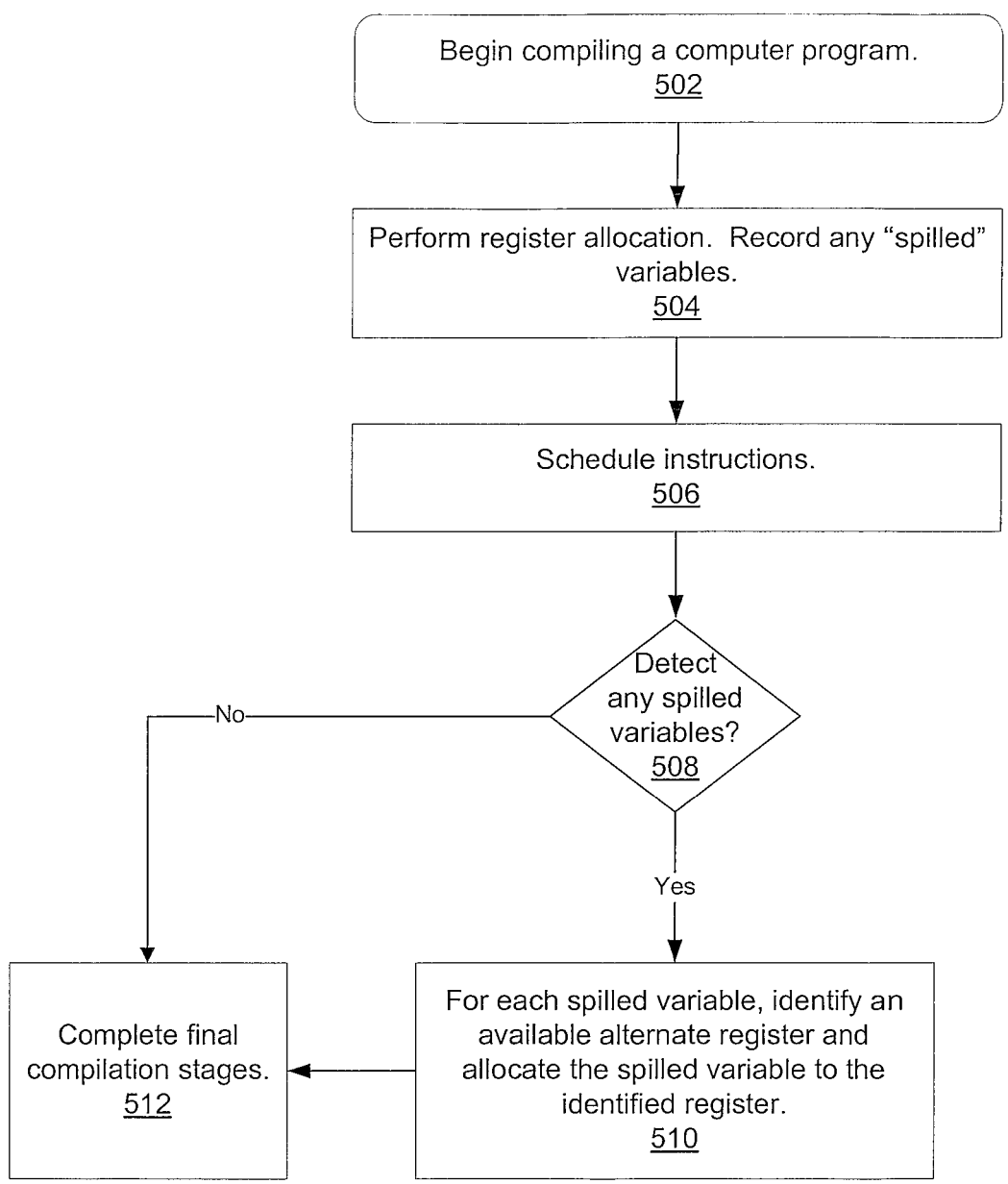
FIG. 5 is a flow diagram illustrating one embodiment of a compiler method for reducing a number of spilled variables.

Referring to FIG. 5, one embodiment of a compiler method 500 for reducing a number of spilled variables is shown. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

Software applications may be written by a designer in a high-level language such as C, C++, Fortran, or other. This source code 122 may be stored on a computer readable medium. A command instruction, which may be entered at a prompt by a user or placed within a scripting language, with any necessary options may be executed in order to compile the source code 122 in block 502. The front-end compilation translates the source code 122 to a lower-level representation. Syntactic and semantic processing as well as some optimizations is performed at this step. Later phases of compilation may be machine-dependent. In block 504, a register allocator 132 may use one of several known techniques for making register allocation assignments. During compilation, there may be more live variables than the machine, such as platforms 150 or 152, has registers in a corresponding register file (register file 104a or 104b). Therefore, the compiler may transfer, or spill, some variables from registers to a stack memory 126. A list of these spilled variables may be created and recorded.

In block 506, the instruction scheduler 134 may rearrange the order of instructions to avoid pipeline stalls and to improve instruction-level parallelism. If no spilled variables are detected while compiling the source code 122 (conditional block 508), then in block 512, the final compilation phases, such as completing object code files and linking these object code files, may be performed. Otherwise, in block 510, for each spilled variable, a spill minimizer 136 or other may identify an available alternate register and allocate the spilled variable to the identified alternate register. In one embodiment, the alternate register may be included in an alternate register file. The spill minimizer 136 may perform code modifications such as replacing the spill store and load instructions with inter-register-file move instructions.

Figure 6:
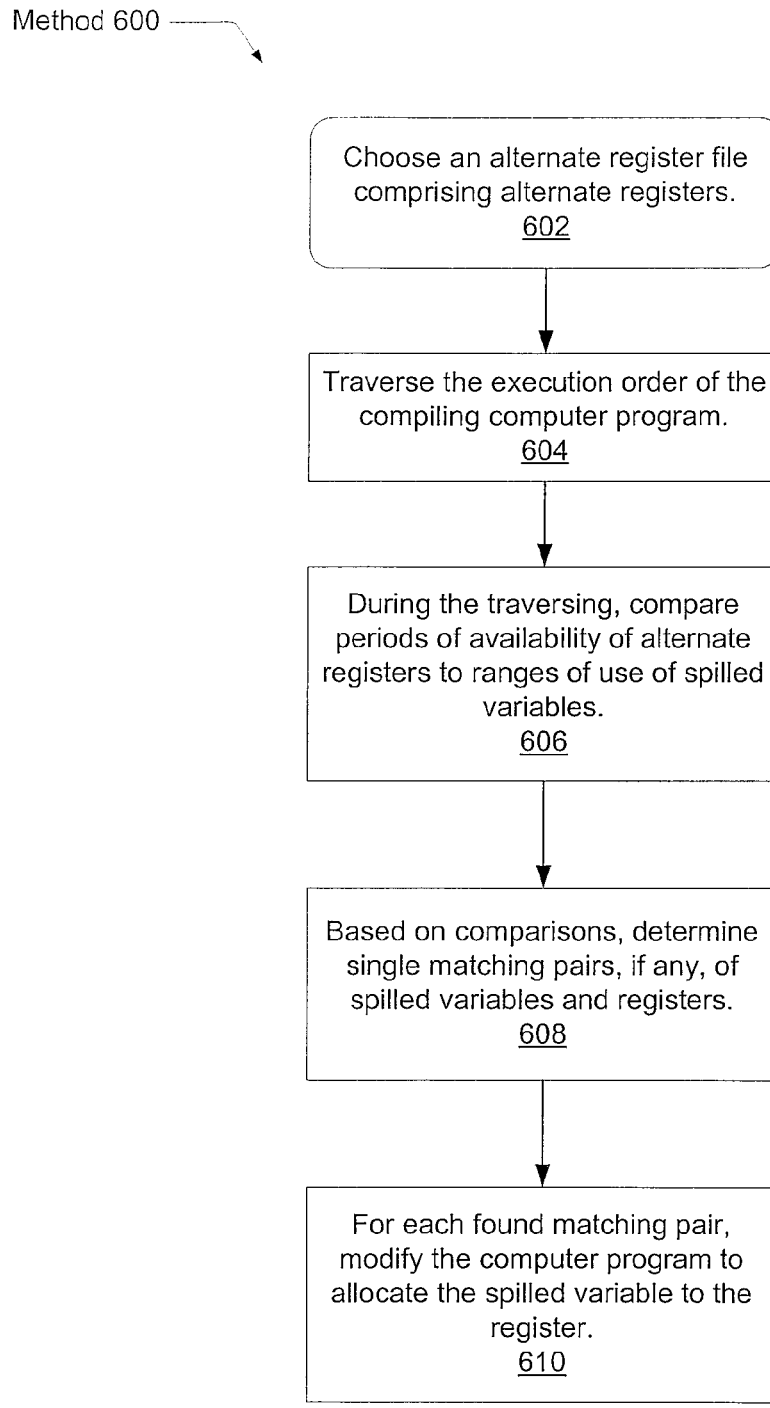
FIG. 6 is a flow diagram illustrating one embodiment of a method for minimizing a number of spilled variables.

Turning now to FIG. 6, one embodiment of a method 600 for minimizing a number of spilled variables is shown. Similar to method 500 and other methods described, method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 600 may describe further details for block 510 in method 500.

One or more spilled variables may be detected as in conditional block 508 of the previous method 500. A spill minimizer 136 or other compilation phase and logic may attempt to reduce the number of spilled variables. Referring to FIG. 4, in order to find matches for possible assignment, one of two starting points may be chosen. A match may correspond to a found pair of a spilled variable and an available alternate register. Regarding the one of two starting point, a method may begin by initially choosing a type of spilled variable, such as integer spilled variables. Then the method may proceed by choosing a particular spilled variable among a set of spilled variables, and subsequently search for available alternate registers. This method may be repeated for other types of spilled variables. Another method may begin by initially choosing an alternate register file, such as a floating-point register file. This other method may proceed by choosing an alternate register within the alternate register file, and subsequently search for matching spilled variables. A matching spilled variable may be a spilled variable with a live range, or period of use, that fits within a period of availability of the alternate register. This other method may be repeated for other types of alternate register files. In the embodiment shown, method 600 utilizes this latter method, although each method is possible and contemplated.

In block 602, for a corresponding type of spilled variables, such as integer spilled variables, an alternate register file is chosen. In one embodiment, a floating-point register file is chosen to be an alternate register file. In one embodiment, only one alternate register file is contemplated. In an alternate embodiment, two or more alternate register files may be available within a platform 150 or 152. In such an embodiment, a single alternate register file may be chosen for any given period of time. For example, for a first time period, a first alternate register file may be chosen from a set of alternate register files based on predetermined criteria. For a second time period, a second alternate register file may be chosen from the set of alternate register files based on the predetermined criteria, and so forth. Alternatively, the two or more alternate register files may be combined logically and the registers within the available alternate register files may be treated as a pool of available registers. As discussed earlier, an initial choice of a register and each subsequent choice of a register may be performed according to an iterative method, a round-robin method, a cost analysis method, or otherwise.

In block 604, the execution order of the computer program being compiled may be traversed. This traversal may be from the beginning of the program to the end of the program as shown in FIG. 3 and FIG. 4. Alternatively, this traversal may be from the end of the program to the beginning of the program. In one embodiment, the instruction scheduler 134 schedules the instructions in a whole function body from the end to the beginning. After the scheduling, two or more separate conflict graphs may be constructed. For example, a first conflict graph, such as a floating-point conflict graph, has nodes that represent the spilled integer value live ranges and the assigned floating-point machine register live ranges, wherein the floating-point register file is the alternate register file. A second conflict graph, such as an integer conflict graph, has nodes that represent the spilled floating-point value live ranges and the integer machine register live ranges assigned by the register allocation, wherein the integer register file is the alternate register file.

The edges in both conflict graphs generated by the spill minimizer 136 as described above represent the conflicts between the nodes. These conflicts may represent the overlapping between spilled value live ranges. These conflicts may also represent the overlapping between spilled value live ranges and the assigned machine register live ranges, or in-use ranges. One embodiment of the overlapping of ranges is shown in FIG. 4. In both conflict graphs, each assigned machine register live range may represent the variable value live ranges assigned to the assigned machine register. The edges of the machine register live range node may represent all the conflicts of the variable value live ranges assigned to the machine register live range node with the nodes that represent the spilled value intervals. In other embodiments, the conflict graphs may be used to generate other tables and structures to represent the live ranges shown in FIG. 4.

In block 606, the periods of availability of alternate registers, such as the chosen register, in an alternate register file may be compared to ranges of use of spilled variables. The use of conflict graphs may automatically supply this information obtained from earlier compiler phases. In block 608, based on comparisons, a single matching pair is found, if any, between the spilled variables and the alternate registers for each period of availability of the alternate register. For example, referring again to FIG. 4, three spilled variables (variables A, C, and D) fit within range 410, but only one spilled variable (variable C), may be assigned to an alternate register, such as register R0.

When multiple spilled variables (such as variables A, C, and D) fit in a period of availability of an alternate register (such as range 410 of register R0), a determination is made to choose one spilled variable among the multiple spilled variables. In one embodiment, this choice may be based on a performance cost analysis. In one embodiment, such a cost analysis may first compute a cycle distance value that comprises a number of cycles executed, which is a first cycle distance, from a store instruction to a location in the stack memory 126 to the load instruction from the location in the stack memory 126. A second cycle distance may be determined to be a number of cycles executed from the load instruction from the location in stack memory 126 to the first use of that loaded value. The shorter the distances for the first and the second cycle distances, the higher the calculated performance cost. A spill variable may have a higher priority for being chosen for assignment if it has a higher performance cost. In one embodiment, a priority formula may be defined as in the following: ((first cycle distance)$^{-1}$+(second cycle distance)$^{-1}$)*100. In the example shown in FIG. 4, regarding range 410, variable C may have a calculated higher priority than variables A and D. Therefore, variable C is chosen to be assigned to register R0.

In block 610, for each found matching pair, such as between the spilled variable C and register R0 in the above example regarding FIG. 4, the code generated for the computer program may be modified to allocate the spilled variable to the alternate register. As discussed earlier, the memory access instructions, such as the store and load instructions used for the spill, may be replaced with inter-register-file move instructions.

Figure 7:
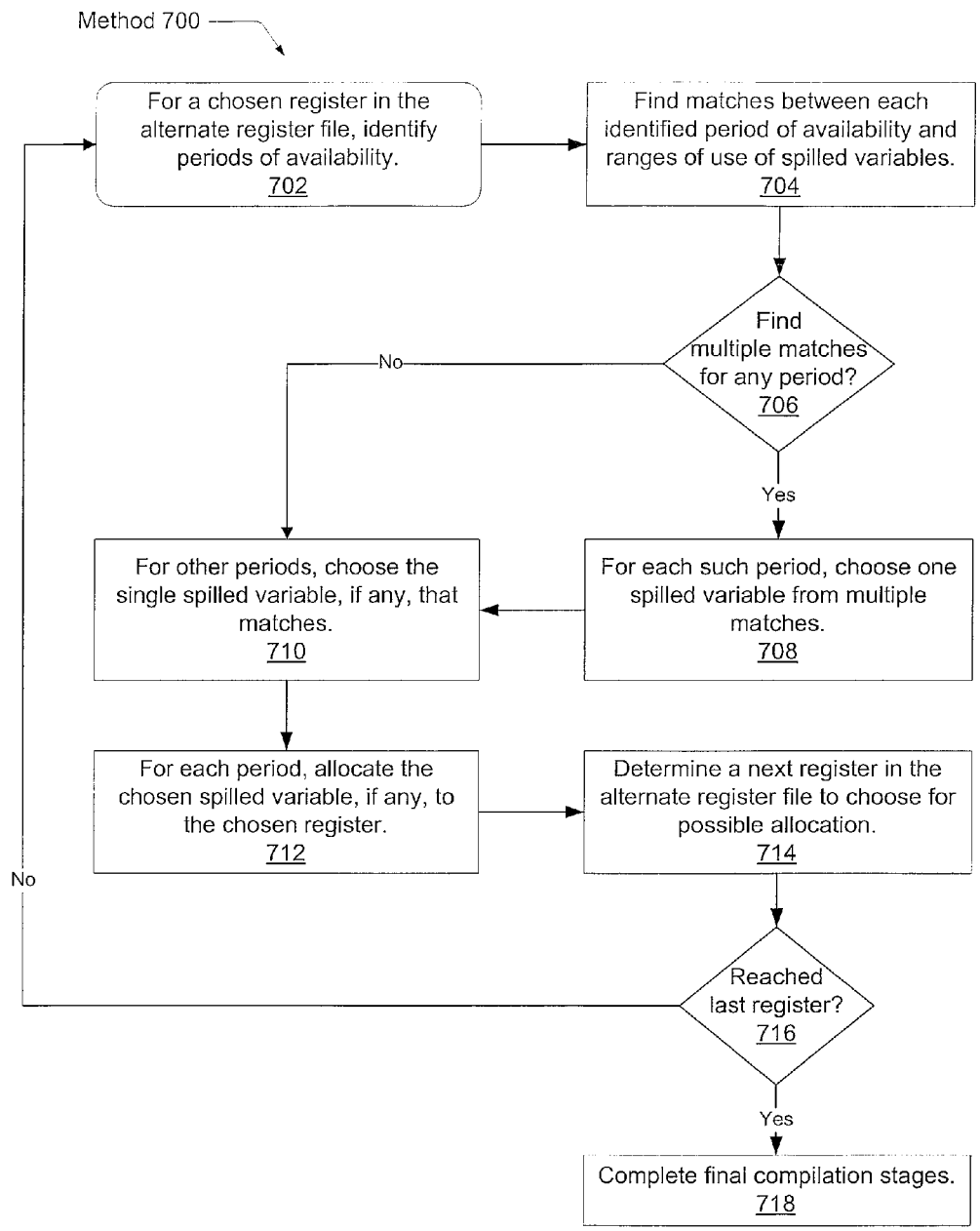
FIG. 7 is a flow diagram illustrating one embodiment of a method for finding possible assignments for alternate registers.

Referring now to FIG. 7, one embodiment of a method 700 for finding possible assignments for alternate registers is shown. Similar to methods 500 and 600, method 700 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 700 may describe further details of the iterative steps used in blocks 606-610 of method 600.

In block 702, an alternate register within an alternate register file is already chosen. As discussed earlier, many methods may be used to first choose an alternate register file followed by an alternate register within the chosen alternate register file. The periods of availability corresponding to the chosen register may be identified as illustrated in FIG. 4. This information may be included in a conflict graph generated by a compiler phase.

In block 704, the periods of availability of the chosen register may be compared to ranges of use of spilled variables as shown in FIG. 4. The use of conflict graphs may automatically supply this information obtained from earlier compiler phases. Based on the comparisons, matches may be found, if any, between the live ranges of spilled variables and period of availability of the chosen register. For example, referring again to FIG. 4, three spilled variables, A, C, and D, fit within range 410. If multiple matches are found for any period (conditional block 706), such as in the given example, then in block 708, for each identified period of availability corresponding to the chosen register, one spilled variable is chosen from the multiple matches. In one embodiment, the high priority formula may be used to determine which spilled variable to choose for each identified period of availability. If multiple matches are not found for any period (conditional block 706), then for each identified period of availability corresponding to the chosen register, either only a single or no spilled variable is available to be assigned to the chosen register. Accordingly, for this case, control flow of method 700 moves from conditional block 706 to block 710. In block 710, a single spilled variable is chosen, if any, such as spilled variable A in range 412 of FIG. 4. It is noted that block 710 may be reached in method 700 by conditional block 706 or block 708. Again, for the case that method 700 reaches block 710 directly from conditional block 706, each identified period of availability of the chosen register has either zero or only one spilled variable available for allocation. For the case that method 700 reaches block 710 via block 708, the chosen register may have zero, one, or multiple identified periods of availability that has either zero or only one spilled variable available for allocation. Also, for this case, the chosen register has at least one identified period of availability that has multiple spilled variables available for allocation as detected by conditional block 706. For both cases, any identified period of availability with zero spilled variables available for allocation has no action taken. Method 700 only performs allocation for identified periods of availability with at least one spilled variable available for allocation.

In block 712, the chosen spilled variable is allocated to the chosen register and the program code is correspondingly modified. In block 714, a next register is determined to be chosen for possible allocation. The choice of a next register to inspect may be determined by a simple increment, a round-robin method, a LRU method, a method based on properties or other characteristics of the registers and their use, or otherwise. One method, for example, may iteratively choose registers within a pool of registers that have been assigned but have periods of availability due to not being utilized. Subsequently, after all registers within the first pool have been chosen, the method may choose registers within a second pool of registers that have not been assigned. Other methods for choosing among the registers within the alternate register file are possible and contemplated.

Once a method for choosing a next register is defined, if a last register has not been chosen based on this method (conditional block 716), then control flow of method 700 moves to block 702. Otherwise, in block 718, the final compilation phases, such as completing object code files and linking these object code files, may be performed.

Various embodiments may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a compiler; and
a memory;
wherein the compiler comprises:
first instructions configured to generate code from a computer program, wherein said generating the code comprises performing register allocation for a plurality of variables of the computer program, and wherein the register allocation results in a plurality of spilled variables; and
second instructions configured to:
determine that a period of use of at least two spilled variables is covered by a period of availability of an available register;
determine a priority of each of the at least two spilled variables, wherein the priority is based at least in part on a number of cycles executed from a stack memory store instruction to a stack memory load instruction for a respective spilled variable;
determine to store a first spilled variable in the available register responsive to determining the first spilled variable has a highest priority of the at least two spilled variables;
wherein in response to the second instructions determining to store the first spilled variable in the available register, the first instructions are configured to modify the code to allocate the first spilled variable to the available register by replacing stack memory store and load instructions corresponding to the first spilled variable with inter-register-file move instructions.

2. The system as recited in claim 1, wherein the second instructions are further configured to identify an alternate register file comprising the available register, wherein the alternate register file is a dedicated register file for an instruction type different from an instruction type of the first spilled variable.

3. The system as recited in claim 2, wherein the instruction type of the at least two spilled variables is one of the following: integer, floating-point, multimedia, and cryptographic.

4. The system as recited in claim 2, wherein the priority of each of the at least two spilled variables is further based on a number of cycles executed from the stack memory load instruction to a first use of the respective spilled variable, wherein a shorter distance from the stack memory store instruction to the stack memory load instruction for the respective spilled variable corresponds to a higher calculated performance cost and a higher priority, and wherein a shorter distance from the stack memory load instruction to the first use of the respective spilled variable corresponds to a higher calculated performance cost and a higher priority.

5. The system as recited in claim 2, wherein, in order to identify the available register, the second instructions are further configured to identify assigned and non-utilized registers prior to identifying unassigned registers within the alternate register file.

6. The system as recited in claim 2, wherein the priority of each of the at least two spilled variables is proportional to a sum of an inverse of the number of cycles executed from the stack memory instruction to the stack memory load instruction for the respective spilled variable and an inverse of the number of cycles executed from the stack memory load instruction to the first use of the respective spilled variable.

7. The system as recited in claim 2, wherein the inter-register-file move instructions are machine instructions that move data directly between a first register file and the alternate register file, and wherein the alternate register file is not directly accessible by the instruction type of the at least two spilled variables.

8. A computer implemented method for compiling a computer program, the method comprising:
  generating, by the computer, code from the computer program, wherein said generating the code comprises performing register allocation for a plurality of variables of the computer program, and wherein the register allocation results in a plurality of spilled variables;
  determining that a period of use of at least two spilled variables is covered by a period of availability of an available register;
  determining a priority of each of the at least two spilled variables, wherein the priority is based at least in part on a number of cycles executed from a stack memory store instruction to a stack memory load instruction for a respective spilled variable;
  determining to store a first spilled variable in the available register responsive to determining the first spilled variable has a highest priority of the at least two spilled variables; and
  modifying, by the computer, the code to allocate the first spilled variable to the available register by replacing stack memory store and load instructions corresponding to the first spilled variable with inter-register-file move instructions, in response to determining to store the first spilled variable in the available register.

9. The method as recited in claim 8, further comprising identifying an alternate register file comprising the available register, wherein the alternate register file is a dedicated register file for an instruction type different from an instruction type of the first spilled variable.

10. The method as recited in claim 9, wherein the instruction type of the at least two spilled variables is one of the following: integer, floating-point, multimedia, and cryptographic.

11. The method as recited in claim 9 further comprising, identifying assigned and non-utilized registers prior to identifying registers within the alternate register file, in order to identify the available register.

12. The method as recited in claim 9, wherein the priority of each of the at least two spilled variables is further based on a number of cycles executed from the stack memory load instruction to a first use of the respective spilled variable, wherein a shorter distance from the stack memory store instruction to the stack memory load instruction for the respective spilled variable corresponds to a higher calculated performance cost and a higher priority, and wherein a shorter distance from the stack memory load instruction to the first use of the respective spilled variable corresponds to a higher calculated performance cost and a higher priority.

13. The method as recited in claim 9, wherein the priority of each of the at least two spilled variables is proportional to a sum of an inverse of the number of cycles executed from the stack memory instruction to the stack memory load instruction for the respective spilled variable and an inverse of the number of cycles executed from the stack memory load instruction to the first use of the respective spilled variable.

14. The method as recited in claim 13, wherein the inter-register-file move instructions are machine instructions that move data directly between a first register file and the alternate register file, and wherein the alternate register file is not directly accessible by the instruction type of the at least two spilled variables further comprising determining the higher priority at least by determining a second cycle distance for the first spilled variable is less than a second cycle distance for the second spilled variable, wherein the second cycle distance is a number of cycles executed from a load instruction from a corresponding location in stack memory to the first use of that loaded value in the computer program.

15. A non-transitory computer readable storage medium storing program instructions, wherein the program instructions are executable by a computer system to compile a computer program, wherein in said compiling, the program instructions are executable by the computer system to:
  generate code from the computer program, wherein said generating the code comprises performing register allocation for a plurality of variables of the computer program, and wherein the register allocation results in a plurality of spilled variables;
  determine that a period of use of at least two spilled variables is covered by a period of availability of an available register;
  determine a priority of each of the at least two spilled variables, wherein the priority is based at least in s art on a number of cycles executed from a stack memory store instruction to a stack memory load instruction for a respective spilled variable;
  determine to store a first spilled variable in the available register responsive to determining the first spilled variable has a highest priority of the at least two spilled variables; and modify the code to allocate the first spilled variable to the available register by replacing stack memory store and load instructions corresponding to the first spilled variable with inter-register-file move instructions, in response to determining to store the first spilled variable in the available register.

16. The non-transitory storage medium as recited in claim 15, wherein the program instructions are further executable to identifying an alternate register file comprising the available register, wherein the alternate register file is a dedicated register file for an instruction type different from an instruction type of the first spilled variable.

17. The non-transitory storage medium as recited in claim 16, wherein the priority of each of the at least two spilled variables is further based on a number of cycles executed from the stack memory load instruction to a first use of the respective spilled variable, wherein a shorter distance from the stack memory store instruction to the stack memory load instruction for the respective spilled variable corresponds to a higher calculated performance cost and a higher priority, and wherein a shorter distance from the stack memory load instruction to the first use of the respective spilled variable corresponds to a higher calculated performance cost and a higher priority.

* * * * *

UNITED STATES PATENT AND TRADEMARK OFFICE
CERTIFICATE OF CORRECTION

| | | |
|---|---|---|
| PATENT NO. | : 9,009,692 B2 | Page 1 of 1 |
| APPLICATION NO. | : 12/647484 | |
| DATED | : April 14, 2015 | |
| INVENTOR(S) | : Kalogeropulos et al. | |

It is certified that error appears in the above-identified patent and that said Letters Patent is hereby corrected as shown below:

On the title page, column 2, item 74 under Attorney, Agent or Firm, line 2, delete "Hand," and insert -- Hood, --, therefor.

In the claims

In column 16, line 59, in claim 17, delete "s art" and insert -- part --, therefor.

Signed and Sealed this
Third Day of November, 2015

Michelle K. Lee
*Director of the United States Patent and Trademark Office*